(12) United States Patent
Machlof

(10) Patent No.: US 12,541,038 B2
(45) Date of Patent: Feb. 3, 2026

(54) SYSTEM AND METHOD FOR DETECTING A BLOCKAGE IN AN INFRASTRUCTURE PIPE

(71) Applicant: LUMINARY INNOVATIONS LTD., Ashkelon (IL)

(72) Inventor: Maor Machlof, Ashkelon (IL)

(73) Assignee: LUMINARY INNOVATIONS LTD., Ashkelon (IL)

( * ) Notice: Subject to any disclaimer, the term of this patent is extended or adjusted under 35 U.S.C. 154(b) by 83 days.

(21) Appl. No.: 18/275,613

(22) PCT Filed: Dec. 27, 2021

(86) PCT No.: PCT/IL2021/051538
§ 371 (c)(1),
(2) Date: Aug. 3, 2023

(87) PCT Pub. No.: WO2022/172261
PCT Pub. Date: Aug. 18, 2022

(65) Prior Publication Data
US 2024/0094431 A1    Mar. 21, 2024

(30) Foreign Application Priority Data
Feb. 9, 2021    (IL) .......................................... 280758

(51) Int. Cl.
*B08B 9/00*      (2006.01)
*F17D 5/00*      (2006.01)
(Continued)

(52) U.S. Cl.
CPC ............. *G01V 15/00* (2013.01); *H02G 1/081* (2013.01); *H04W 4/80* (2018.02)

(58) Field of Classification Search
CPC . G01V 15/00; G01V 3/30; G01V 3/00; G01V 3/104; G01V 3/12; G01V 3/17;
(Continued)

(56) References Cited

U.S. PATENT DOCUMENTS 6,380,743 B1    4/2002  Selvog
7,028,904 B2 *  4/2006  Schmidt ............. G06K 7/10891
                                                       235/462.46

(Continued)

FOREIGN PATENT DOCUMENTS

DE    102005021180    11/2006
EP         2313211     4/2011
(Continued)

*Primary Examiner* — Dionne Pendleton
(74) *Attorney, Agent, or Firm* — PEARL COHEN ZEDEK LATZER BARATZ LLP

(57) ABSTRACT

In one aspect, the present invention is directed to a system for detecting a blockage in an infrastructure pipe (16), the system comprising: a stahlband device (10) having a cable (11) and a hooking device (12) at one side thereof an RIT tag (22), disposed at the side; and an RIT reader (23), for communicating with the RIT tag (22), the RIT reader being adapted to detect an intensity of a communication signal (24) of the RIT reader with the RIT tag (22), thereby allowing detecting a blockage (21) in an infrastructure pipe (16) by detecting a location of the RIT tag (22) according to an intensity of the communication signal (24). Preferably, the RIT tag is an RFID tag, and the RIT reader is an RFID reader.

12 Claims, 7 Drawing Sheets

(51) Int. Cl.
*G01V 15/00* (2006.01)
*H02G 1/08* (2006.01)
*H04W 4/80* (2018.01)

(58) Field of Classification Search
CPC ............ G01V 3/28; H02G 1/081; H02G 1/02; H02G 1/083; H02G 1/085; H04W 4/80; G08C 17/02; G01S 13/08; G01S 19/01; G01S 5/0295; G01S 5/04; G01N 22/00; G01N 3/567; G01N 17/00; G01N 27/041; G01N 27/226; G01N 33/2876; F17D 3/01; F17D 5/06; F17D 1/08; F17D 5/00; F17D 5/005; F16L 55/48; F16L 2101/12; F16L 2101/30; F16L 2101/60; F16L 55/46; F16L 2101/40; F16L 41/008; F16L 55/162; F16L 55/164; F16L 55/28; F16L 55/30; F16L 57/06; B08B 9/0551; B08B 9/0554; B08B 3/02; B08B 3/04; B08B 3/10; B08B 3/102; B08B 9/055; G06K 19/07758; G06K 19/07798; G06K 2207/1012; G06K 7/10; G06K 7/10544; G06K 7/10564; G06K 7/10584; G06K 7/10594; G06K 7/10603; G06K 7/10663; G06K 7/10673; G06K 7/10693; G06K 7/10702; G06K 7/10792; G06K 7/10801; G06K 7/10811; G06K 7/10851; G06K 7/10861; G06K 7/10871; G06K 7/10881; G06K 7/10891; G06K 7/14; G06K 19/0723; G06K 19/07724; G06K 19/07749; H01B 13/34; H01B 3/08; H01B 5/105; H01B 7/041; H01B 7/1805; H01B 7/288; H01B 7/32; H01B 7/36; H01B 7/366; H01B 7/368; H01B 9/003; H01B 9/005; H01B 9/006; H01B 9/008; H01B 13/341; A61B 1/005; A61B 1/31; A61B 2034/2051; A61B 2090/062; A61B 2090/397; A61B 2090/3983; A61B 34/20; A61B 5/064; A61B 5/065; A61B 5/068; A61B 8/4254; A61B 90/361; A61B 90/98; B05B 12/08; B05B 12/1481; B24D 13/14; B66C 13/23; B66C 13/46; B66C 13/50; B66C 15/00; B66C 23/88; B66C 2700/084; B66C 15/065; B66D 1/56; B66D 1/505; B82Y 15/00; E21B 43/267; E21B 47/11; E21B 47/13; E21B 33/05; E21B 33/138; E21B 47/00; E21B 47/09; E21B 47/12; G01M 11/086; G01M 3/005; G01M 5/0058; H04Q 2209/40; H04Q 9/00; H04L 67/12; H04B 13/00; H04B 7/00; H04B 7/15; H04B 3/02; H04B 3/46; H04B 5/70; H04B 5/77; H01Q 1/04; H01Q 1/2208; H01Q 1/44; H01Q 13/28; G06Q 10/087; G06F 11/1456; G06F 11/1458; G06F 11/1464; G02B 6/02395; G02B 6/562; G02B 6/502; G01R 31/085; G01R 29/12; G01R 29/24; G01R 31/08; G01R 31/088; G01R 22/00; G01R 3/567; Y10T 428/13; Y10T 428/239; H05K 2203/1316; H05K 2203/1322; H05K 3/284; B65D 1/00; B65D 2203/10; B29K 2023/06; B29K 2023/12; B29K 2025/00; B29K 2067/00; B29K 2105/253; B29K 2105/26; B29L 2009/001; B29L 2031/3456; B29L 2031/712; B29B 11/08; B29B 11/14; G01D 5/35354; G01D 5/35358; G01D 5/35374; B01D 2201/52; B01D 2201/56; B01D 35/143; B60L 2200/10; B60L 2260/32; B60L 9/00; B60P 1/00; B64F 3/02; B64U 10/60; B64U 2101/20; B64U 2201/202; B65G 1/0492; F01M 11/10; F01M 2011/1406; F16N 2200/08; F16N 2260/18; F41H 11/136; G01F 23/223; G01F 1/56; G01B 7/06; G05D 1/0016; H01R 4/2406; H01R 4/643; H01R 9/20; H01R 43/28; G11B 15/6835; G11B 17/225; B65H 2701/376; B65H 63/086; B65H 75/182; B65H 75/28; B65H 75/40; B65H 75/406; B65H 5/4402; B65H 75/4471; B65H 75/4486; B65H 75/4494

See application file for complete search history.

(56) References Cited

U.S. PATENT DOCUMENTS

| | | | |
|---|---|---|---|
| 10,809,408 | B1 | 10/2020 | Olsson et al. |
| 2008/0136648 | A1* | 6/2008 | Endrikhovski ...... G06Q 10/087 340/10.42 |
| 2013/0328693 | A1* | 12/2013 | Mohamadi ............ E21B 43/267 340/854.6 |
| 2016/0319980 | A1* | 11/2016 | Hofer ..................... G01V 15/00 |
| 2019/0265430 | A1* | 8/2019 | Nitsche ..................... F17D 3/00 |
| 2022/0026249 | A1* | 1/2022 | Wang ........................ F17D 5/06 |

FOREIGN PATENT DOCUMENTS

| | | |
|---|---|---|
| EP | 3772067 | 2/2021 |
| FR | 2892570 | 4/2007 |
| JP | 2017-032536 A | 2/2017 |
| WO | WO 2020/219289 | 10/2020 |

* cited by examiner

STEP 2

SYSTEM AND METHOD FOR DETECTING A BLOCKAGE IN AN INFRASTRUCTURE PIPE

TECHNICAL FIELD

The present invention relates to the field of electricity network infrastructure of a building construction.

BACKGROUND ART

The term "electricity network" refers herein to a network of pipes disposed in a room's walls including its ceiling. Such pipes are referred as "infrastructure pipes". The pipes are placed in the walls and ceiling before the plastering stage. Later on the electrical wires are disposed inside the infrastructure pipes by an instrument called "stahlband".

A stahlband, which is the German translation of steel band, comprises a cable, usually made of steel, in which at the end thereof is installed a hooking device. Since the wire is made of steel, it has some flexibility, which allows only a limited bending. As such, the stahlband can be passed through an infrastructure pipe until it comes out from the other side of the pipe. Then the electrical wire is connected to the hooking device, and is passed to the other side of the pipe by pulling the stahlband.

A major problem with this technology is a presence of a blockage inside infrastructure pipes. Since in the prior art no solution is provided for detecting the blockage, a constructor has to spend time for detecting the blockage and removing it.

As such, there is a long felt need of a solution to the problems of the prior art described herein.

Other objects and advantages of the invention will become apparent as the description proceeds.

SUMMARY OF THE INVENTION

RIT, the acronym of Radio Identification Technology refers herein to a radio identification technology, such as RFID and many other technologies that are available presently in the market. It comprises a tag, which is referred herein as RIT tag, and a corresponding reader, which is referred herein as RIT reader, such as in the RFID technology. Ultra Wide-Band (UWB) RTLS, WiFi RTLS and AirFinder are technologies that provide RFID like functionality.

In one aspect, the present invention is directed to a system for detecting a blockage in an infrastructure pipe (16), the system comprising:
   a stahlband device (10) having a cable (11) and a hooking device (12) at one side thereof,
   an RIT tag (22), disposed at the side; and
   an RIT reader (23), for communicating with the RIT tag (22), the RIT reader being adapted to detect an intensity of a communication signal (24) of the RIT reader with the RIT tag (22),
   thereby allowing detecting a blockage (21) in an infrastructure pipe (16) by detecting a location of the RIT tag (22) according to an intensity of the communication signal (24).

Preferably, the RIT tag is an RFID tag, and the RIT reader is an RFID reader.

The RIT tag may be passive as well as active.

According to one embodiment of the invention, the RIT reader may comprise an audio player for playing an audio signal in an intensity which is a function of strength of the communication.

According to one embodiment of the invention, the RIT reader comprises an audio player for playing a flickering audio signal, wherein the denser the flickering, the stronger the communication signal.

According to one embodiment of the invention, the RIT reader comprises a light fixture that its lighting intensity is a function of strength of the communication.

According to one embodiment of the invention, the RIT reader comprises a light fixture for displaying a flickering light signal, wherein the denser the flickering, the stronger the communication signal.

According to one embodiment of the invention, the RIT tag comprises a first RIT tag device detectable from a distance up to 10 cm, and a second the RIT tag device detectable from a distance of greater than 10 cm, thereby allowing firstly detecting a general direction of the blockage, and then detecting the blockage more accurately.

According to one embodiment of the invention, the RIT reader comprises a pointer (27) pointing on a direction of a corresponding RIT tag.

In another aspect, the present invention is directed to a method for detecting a blockage in an infrastructure pipe, the method comprising the steps of;
   providing an RIT tag, and attaching thereof to an end of a stahlband device;
   upon blocking an advance of a cable of the stahlband device in the infrastructure pipe, approaching an RIT reader to a location where an RIT communication signal with the RIT tag is an highest,
   thereby detecting a location proximate to the blocking.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

Figure 1:
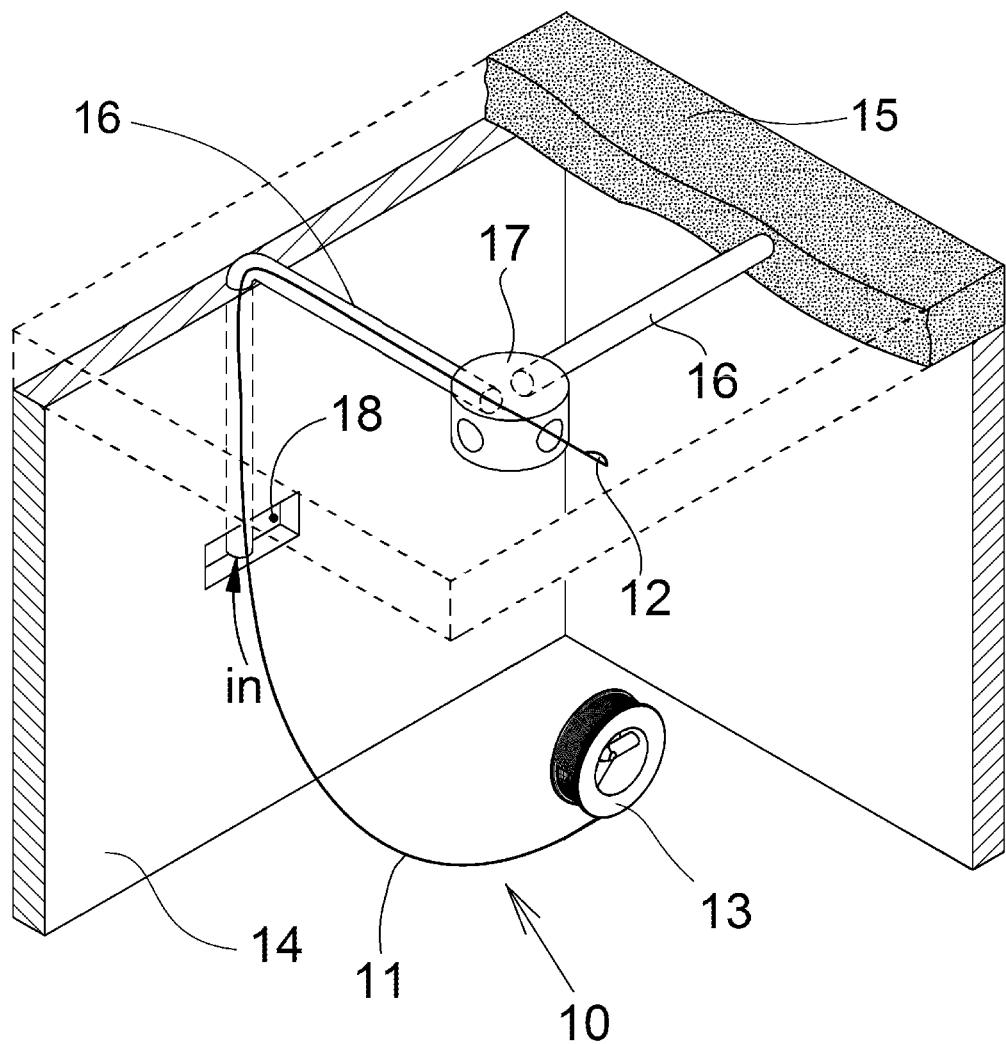
FIG. 1 schematically illustrates a structure of a room, according to the prior art.

FIG. 1 schematically illustrates a structure of a room, according to the prior art.

In the wall 14 and in the ceiling 15 is installed an infrastructure pipe 16. Numeral 17 denotes a junction box disposed on the ceiling 15. Numeral 18 denotes a terminal box disposed at wall 14.

The stahlband 10 comprises (a) a cable 11 which has a limited flexibility, (b) a hooking device 12 at one end thereof, and (c) a coil of the limited flexibility cable 13 at the other end thereof. Preferably, the cable is made of steel.

FIG. 1 also illustrates a first step of operating a stahlband. A user pushes the stahlband cable 11 into an infrastructure pipe 16 until it emerges through the other end of the infrastructure pipe 16.

Figure 2:
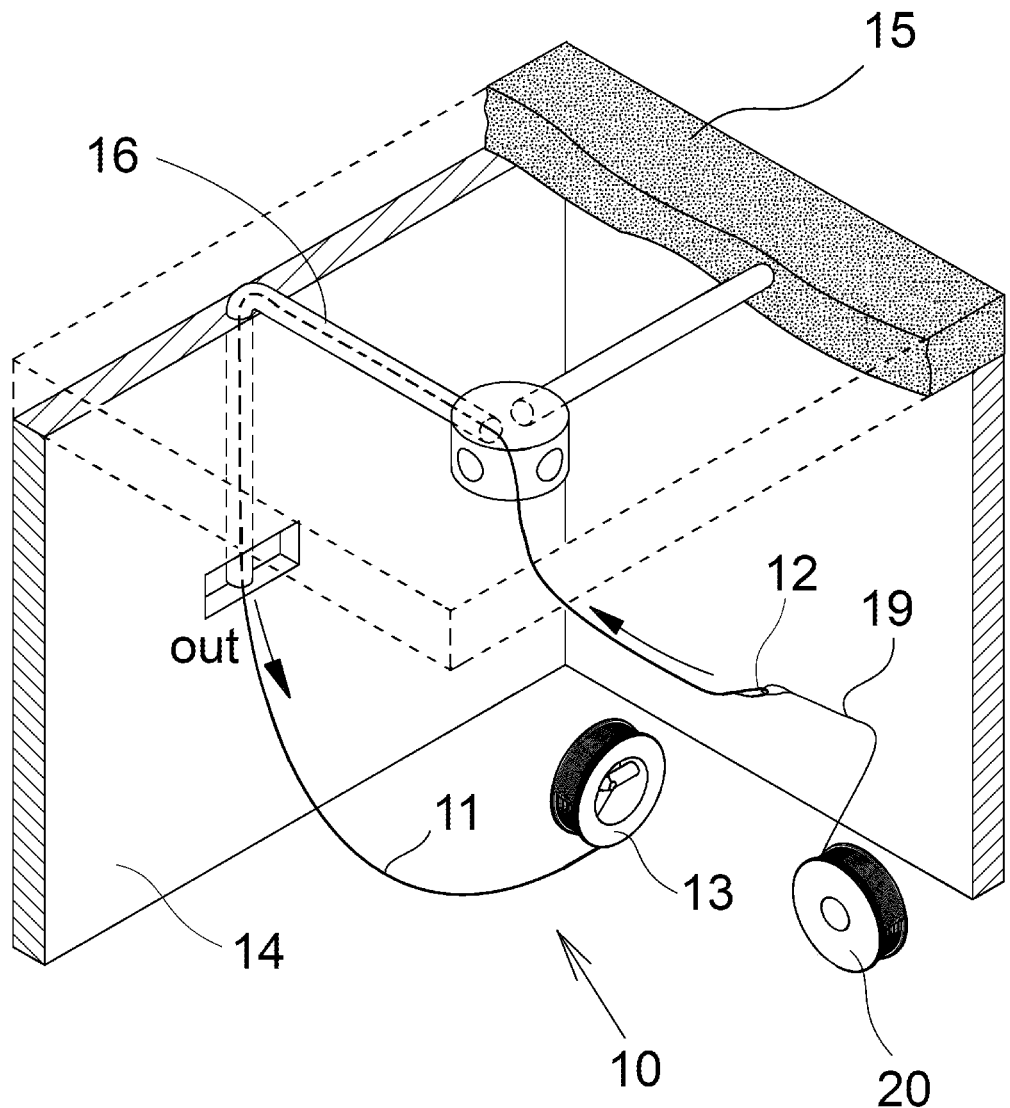
FIG. 2 schematically illustrates a second step of operating a stahlband, according to the prior art.

FIG. 2 schematically illustrates a second step of operating a stahlband, according to the prior art.

In this step, the user ties the electrical wire 19 to the hooking device 12 of the stahlband, and pulls the stahlband back until the electrical wire 19 emerges from the entry of the infrastructure pipe 16.

Figure 3:
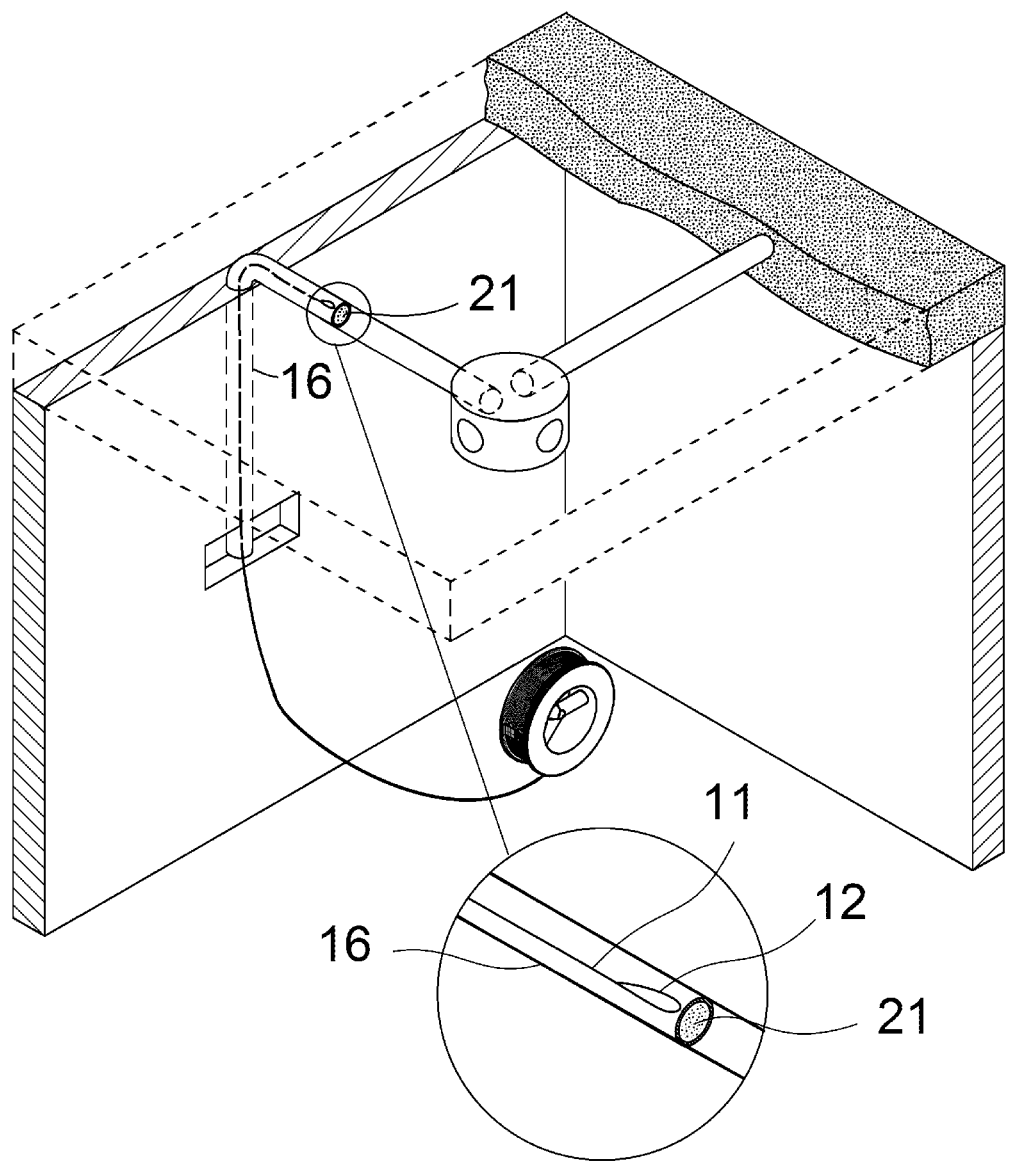
FIG. 3 schematically illustrates a blockage that blocks a stahlband wire from advancing, according to the prior art.

FIG. 3 schematically illustrates a blockage that blocks a stahlband wire from advancing, according to the prior art.

Reference numeral 21 denotes a blockage.

When such blockage is present in an infrastructure pipe, the user needs to detect the location of the blockage, break the wall or ceiling at this place, remove the blockage, and repair the infrastructure pipe. Only then he can continue with the wiring process. Such a blockage may delay the work for several hours.

Until now there is no solution for detecting the blockage location. According to the present invention, an RFID tag is attached to the end of a stahlband cable 11, close to the hooking device 12, and therefore the end of the stahlband cable can be detected by a signal intensity of communication with an RFID reader.

"Radio-frequency identification (RFID) uses electromagnetic fields to automatically identify and track tags attached to objects. An RFID system consists of a tiny radio transponder, a radio receiver and transmitter. When triggered by an electromagnetic interrogation pulse from a nearby RFID reader device, the tag transmits digital data, usually an identifying inventory number, back to the reader. This number can be used to track inventory goods.

There are two types of RFID tags:

Passive tags are powered by energy from the RFID reader's interrogating radio waves.

Active tags are powered by a battery and thus can be read at a greater range from the RFID reader, up to hundreds of meters.

Unlike a barcode, the tag does not need to be within the line of sight of the reader, so it may be embedded in the tracked object." (From Wikipedia)

"Hitachi holds the record for the smallest RFID chip, at 0.05 mm×0.05 mm. This is 1/64th the size of the previous record holder, the mu-chip. [23] Manufacture is enabled by using the silicon-on-insulator (SOT) process. These dust-sized chips can store 38-digit numbers using 128-bit Read Only Memory (ROM). [24] A major challenge is the attachment of antennas, thus limiting read range to only millimeters." (From Wikipedia)

Since the RFID tag can be detected by an RFID reader, and since an RFID reader can measure the intensity of the RF (Radio Frequency) signal, the intensity of the signal can be used for detecting a distance of the RFID tag from the RFID reader.

Figure 4A:
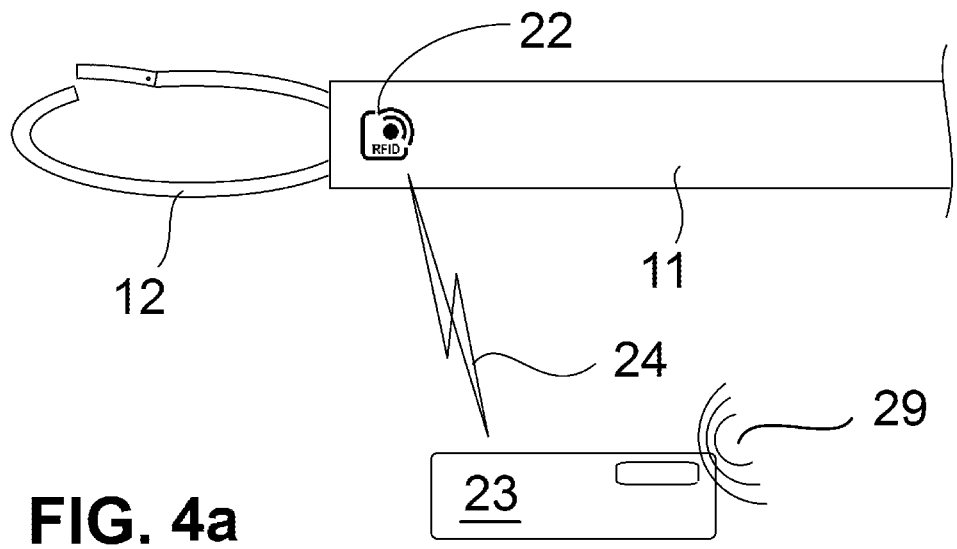
FIG. 4a schematically illustrates a system for detecting a blockage in an infrastructure pipe, according to one embodiment of the invention.

FIG. 4a schematically illustrates a system for detecting a blockage in an infrastructure pipe, according to one embodiment of the invention.

The system comprises a stahlband device comprising a limited flexibility cable 11, as in the prior art; a hooking device 12, as in the prior art; an RFID tag 22; and an RFID reader 23.

The RFID reader communicates with the RFID tag via RFID communication signal 24. The strength of the communication signal 24 is displayed to a user by the RFID reader 23, either by an audio and/or visual alerting 29. For example, the intensity of the alerting signal 29, whether is an audio or visual signal, is a function of the strength of the RFID communication signal 24.

The user tries to approach the RFID reader 23 to the location in which the RFID communication signal intensity is the highest. The blockage is in the infrastructure pipe close to this place.

As explained, the strength of the communication signal can be displayed to the user via either visual and/or sound. The stronger the communication signal, the greater the intensity of the light/sound.

Another way to display this information is through flickering. The denser the flickering, the stronger the communication signal.

Figure 4B:
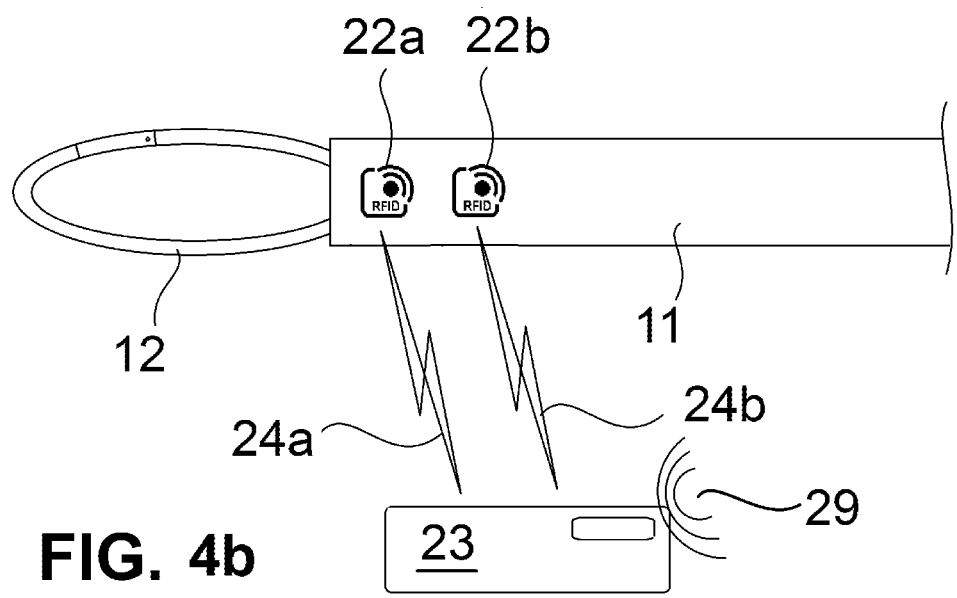
FIG. 4b schematically illustrates a system for detecting a blockage in an infrastructure pipe, according to a further embodiment of the invention.

FIG. 4b schematically illustrates a system for detecting a blockage in an infrastructure pipe, according to a further embodiment of the invention.

Some RFID systems are designed for the short distance between the tag and the reader, such as up to 10 cm, there are systems for larger distances, such as meters or more, and even tens and hundreds of meters. Therefore, in order to improve the detection of the RFID tag, two or more tags can be used, one for short distances (for example up to 10 cm), and the other for larger distances. The direction is first located using the long-distance tag, and once the communication with short-range tag is effective, the blockage can be reached more accurately.

The figure illustrates two RFID tags 22a and 22b, and an RFID reader 23, which communicates with both tags simultaneously.

Figure 5:
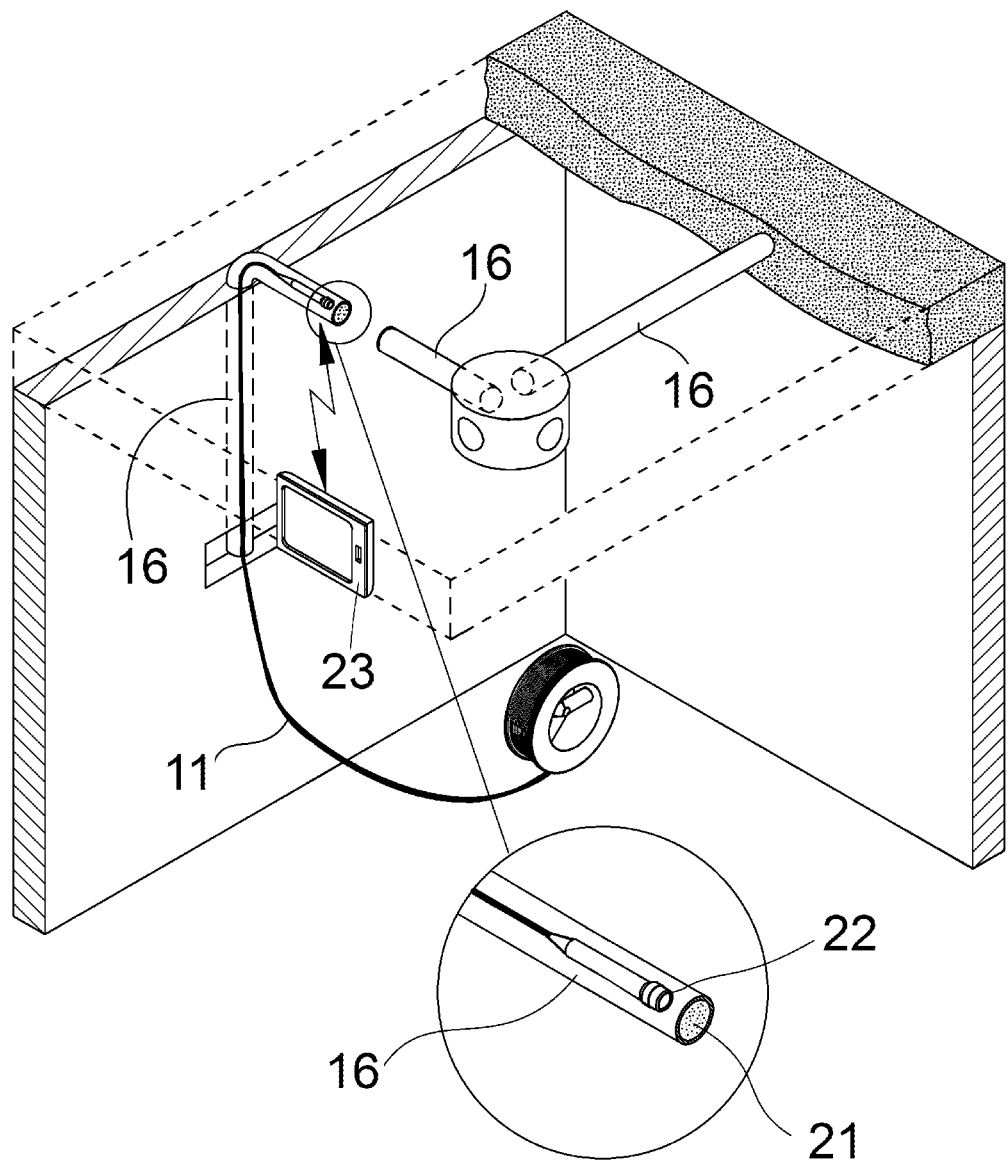
FIG. 5 schematically illustrates a detection of a blockage by a system for detecting a blockage in an infrastructure pipe, according to one embodiment of the invention.

FIG. 5 schematically illustrates a detection of a blockage by a system for detecting a blockage in an infrastructure pipe, according to one embodiment of the invention.

When a blockage happens, the user brings the RFID reader 23 closer as possible to the blockage by approaching the reader to the location from where the intensity of the detected signal is the highest. At this location he breaks the wall/ceiling, cuts the infrastructure pipe 16, removes the blockage 21, repairs the broken pipe, and continues with threading the stahlband cable 11. The broken pipe can be repaired by an adapter, as illustrated in FIG. 6 by component 28.

Figure 6:
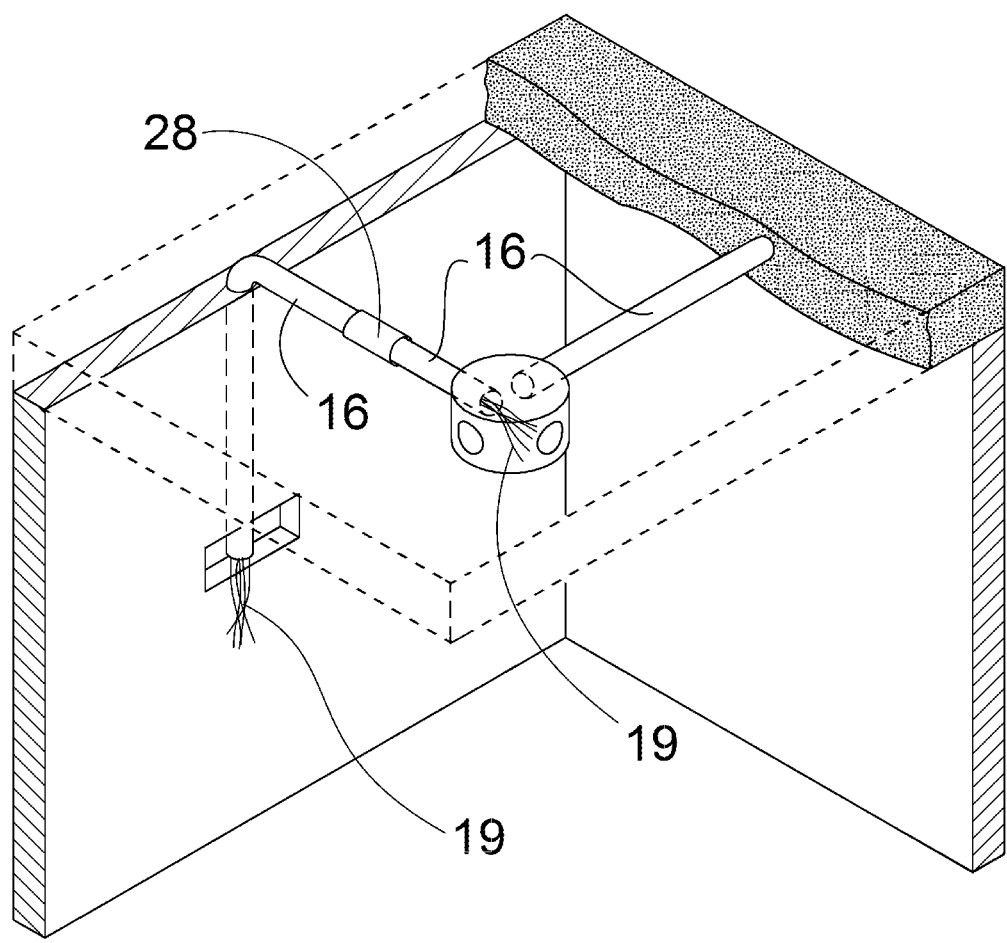
FIG. 6 schematically illustrates a repaired infrastructure pipe, according to one embodiment of the invention.

FIG. 6 schematically illustrates a repaired infrastructure pipe, according to one embodiment of the invention.

As illustrated, an adapter 28 is installed instead of the removed part of the infrastructure pipe 16, and the electrical wire is passed through the pipe.

Figure 7A:
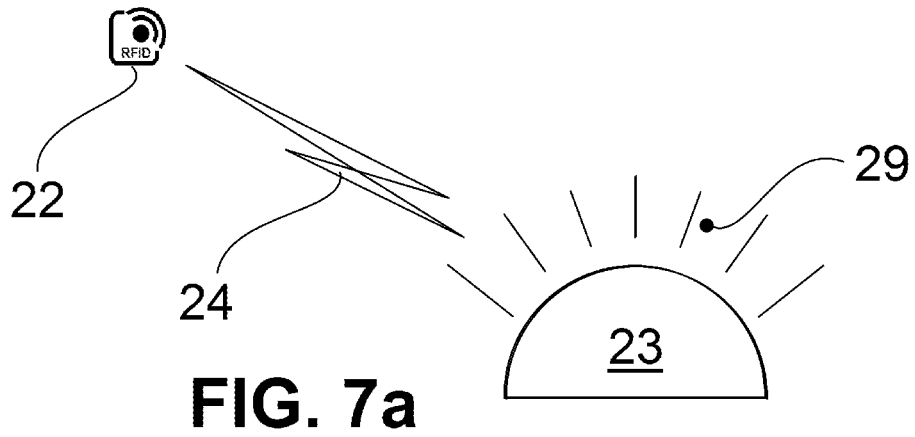
FIG. 7a schematically illustrates an RFID reader of a system for detecting a blockage in an infrastructure pipe, according to one embodiment of the invention.

FIG. 7a schematically illustrates an RFID reader of a system for detecting a blockage in an infrastructure pipe, according to one embodiment of the invention.

From a user point of view, the RFID reader 23 according to this embodiment is a "simple" device which comprises displays audio and/or video signal which is a function of the RFID communication signal strength, as explained hereinabove. It is adapted to work only with a corresponding RFID tag 22.

Figure 7B:
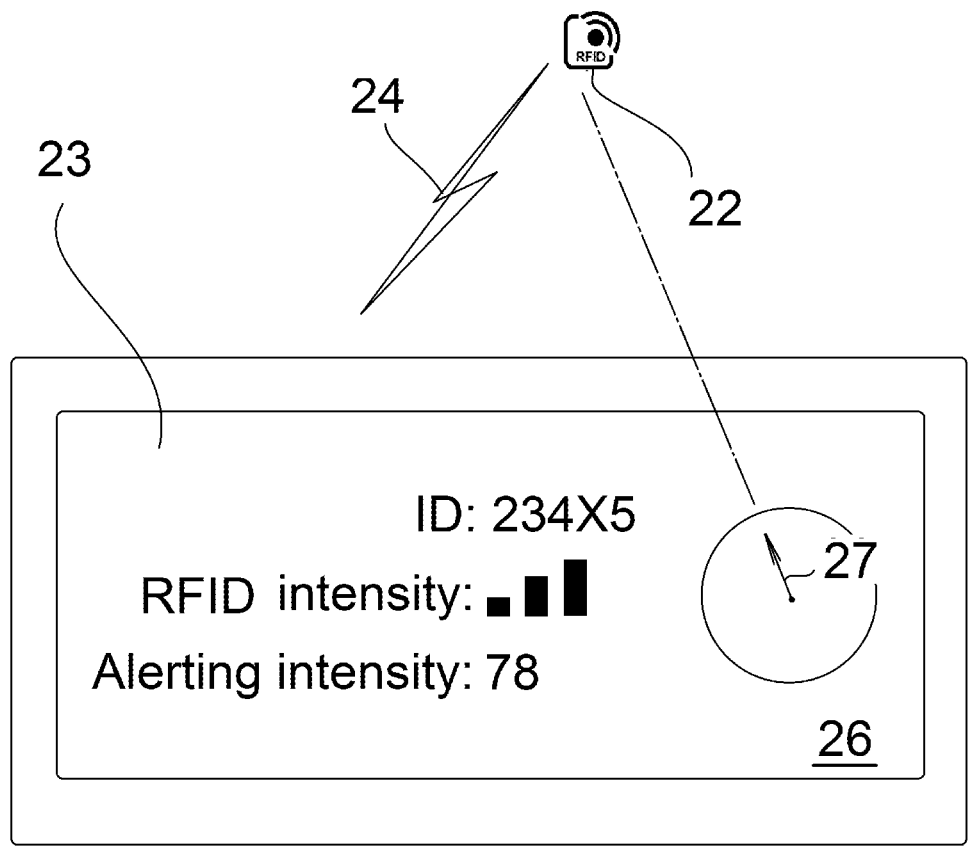
FIG. 7b schematically illustrates an RFID reader of a system for detecting a blockage in an infrastructure pipe, according to another embodiment of the invention.

FIG. 7b schematically illustrates an RFID reader of a system for detecting a blockage in an infrastructure pipe, according to another embodiment of the invention.

The RFID reader according to this embodiment of the invention is a box that comprises a display 26 on which are displayed informative details, such as the RFID communication strength. Of course, the RFID reader 23 is capable of playing an audio and/or visual signal, which is a function of the RFID communication signal strength, as explained hereinabove.

The RFID reader according to this embodiment of the invention comprises also a pointer 27 which points on the direction where the RFID communication strength is the highest, i.e., the location of the corresponding RFID tag.

For the sake of brevity, in FIGS. 7a and 7b the infrastructure pipe is not illustrated.

In the figures and/or description herein, the following reference numerals (Reference Signs List) have been mentioned:

numeral 10 denotes a stahlband device;
numeral 11 denotes a stahlband cable having a limited flexibility (referred herein also as stahlband cable);
numeral 12 denotes a hooking device;
numeral 13 denotes a coiled steel cable;
numeral 14 denotes a wall;
numeral 15 denotes a ceiling;
numeral 16 denotes an infrastructure pipe;
numeral 17 denotes a junction box;
numeral 18 denotes a terminal box;
numeral 19 denotes an electrical wire;
numeral 20 denotes a coiled electrical wire;
numeral 21 denotes a blockage;
each of numerals 22, 22a and 22b denotes an RFID tag;
numeral 23 denotes an RFID reader;
numeral 24 denotes RFID communication signal;
numeral 26 denotes a display;
numeral 27 denotes a direction pointer of an RFID reader that points on the corresponding RFID tag;
numeral 28 denotes an adapter; and
numeral 29 denotes an alerting audio/visual signal.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A system for detecting a blockage in an infrastructure pipe, the system comprising:
a stahlband device comprising a cable, the stahlband device being configured to be advanced through the infrastructure pipe by a force applied at a proximal end of the cable;
an Radio Identification Technology (RIT) tag attached to the distal end of the cable; and
an RIT reader for communicating with said RIT tag, said RIT reader being adapted to be positioned outside the infrastructure pipe and to detect an intensity of a communication signal of said RIT tag, thereby allowing detecting a location of the blockage of advancing the stahlband device through the infrastructure pipe by detecting a location of said RIT tag according to the intensity of its communication signal.

2. A system according to claim 1, wherein said RIT tag is an RFID tag, and said RIT reader is an RFID reader.

3. A system according to claim 1, wherein said RIT tag is passive.

4. A system according to claim 1, wherein said RIT tag is active.

5. A system according to claim 1, wherein said RIT reader comprises an audio player for playing an audio signal in an intensity which is a function of strength of said communication.

6. A system according to claim 1, wherein said RIT reader comprises an audio player for playing a flickering audio signal, wherein the denser the flickering, the stronger the communication signal.

7. A system according to claim 1, wherein said RIT reader comprises a light fixture that its lighting intensity is a function of strength of said communication.

8. A system according to claim 1, wherein said RIT reader comprises a light fixture for displaying a flickering light signal, wherein the denser the flickering, the stronger the communication signal.

9. A system according to claim 1, wherein said RIT tag comprises a first RIT tag device detectable from a distance up to 10 cm, and a second said RIT tag device detectable from a distance of greater than 10 cm, thereby allowing firstly detecting a general direction of said blockage, and then detecting said blockage more accurately.

10. A system according to claim 1, wherein said RIT reader comprises a pointer pointing on a direction of a corresponding RIT tag.

11. A method for detecting a blockage in an infrastructure pipe, the method comprising the steps of:
providing an Radio Identification Technology (RIT) tag, and attaching the RIT tag to a distal end of a cable included in a stahlband device;
pushing the cable inside the infrastructure pipe by applying a force at a proximal end of the cable such that the stahlband device advances through the infrastructure pipe;
upon detection of cessation of the advance of the cable of said stahlband device in said infrastructure pipe being blocked, moving an RIT reader outside the infrastructure pipe to detect a location where an RIT communication signal with said RIT tag is highest,
thereby detecting a location proximate to said blocking.

12. A method according to claim 11, wherein said RIT tag is an RFID tag, and said RIT reader is an RFID reader.

\* \* \* \* \*